US008888875B2

(12) United States Patent
Ramamurthy

(10) Patent No.: US 8,888,875 B2
(45) Date of Patent: Nov. 18, 2014

(54) METHODS FOR FEEDSTOCK PRETREATMENT AND TRANSPORT TO GASIFICATION

(75) Inventor: Pritham Ramamurthy, Sugar Land, TX (US)

(73) Assignee: Kellogg Brown & Root LLC, Houston, TX (US)

(*) Notice: Subject to any disclaimer, the term of this patent is extended or adjusted under 35 U.S.C. 154(b) by 2403 days.

(21) Appl. No.: 11/646,685

(22) Filed: Dec. 28, 2006

(65) Prior Publication Data

US 2008/0155899 A1    Jul. 3, 2008

(51) Int. Cl.
| | | |
|---|---|---|
| C01B 3/36 | (2006.01) | |
| C10J 3/86 | (2006.01) | |
| C10J 3/78 | (2006.01) | |
| C10K 1/02 | (2006.01) | |
| C10K 1/04 | (2006.01) | |
| C10K 1/10 | (2006.01) | |
| C10K 3/00 | (2006.01) | |
| C10K 3/04 | (2006.01) | |

(52) U.S. Cl.
CPC .... *C10J 3/86* (2013.01); *C10J 3/78* (2013.01); *C10K 1/02* (2013.01); *C10K 1/024* (2013.01); *C10K 1/04* (2013.01); *C10K 1/101* (2013.01); *C10K 3/001* (2013.01); *C10K 3/04* (2013.01); *C10J 2300/0903* (2013.01); *C10J 2300/0916* (2013.01); *C10J 2300/093* (2013.01); *C10J 2300/0943* (2013.01); *C10J 2300/0959* (2013.01); *C10J 2300/0969* (2013.01); *C10J 2300/0989* (2013.01); *C10J 2300/1671* (2013.01)
USPC .......................................................... 48/197 R

(58) Field of Classification Search
USPC .................................................... 48/77, 210
See application file for complete search history.

(56) References Cited

U.S. PATENT DOCUMENTS

| | | | |
|---|---|---|---|
| 4,199,327 | A | 4/1980 | Hempill |
| 4,230,556 | A | 10/1980 | Carr et al. |
| 4,244,706 | A | 1/1981 | Forney et al. |

(Continued)

FOREIGN PATENT DOCUMENTS

WO    WO 2004065847 A2    8/2004

OTHER PUBLICATIONS

Maurstad, Ola. "An Overview of Coal based Integrated Gasification Combined Cycle (IGCC) Technology," Massachusetts Institute for Technolgy—Laboratory for Energy and the Environment, Sep. 2005, MIT LFEE 2005-002 WP, pp. 1-36.

(Continued)

*Primary Examiner* — Imran Akram
(74) *Attorney, Agent, or Firm* — Gary M. Machetta

(57) ABSTRACT

Methods for pretreating feedstock for gasification are provided. At least a portion of a coal based feedstock stream can be combined with at least a portion of a supercritical carbon dioxide stream within a pretreatment system to provide a treated feedstock stream. At least a portion of the treated feedstock stream can be passed to a gasifier to produce a synthesis gas stream of less than 50% by volume carbon dioxide, at least 5% by volume carbon monoxide and at least 1% by volume hydrogen. At least a portion of the synthesis gas stream can be combusted to form an exhaust stream comprising carbon dioxide. At least a portion of the gasification byproduct stream can be purified and compressed to produce supercritical carbon dioxide. At least a portion of the supercritical carbon dioxide can be recycled to the pretreatment system via a supercritical carbon dioxide stream.

16 Claims, 2 Drawing Sheets

(56) References Cited

U.S. PATENT DOCUMENTS

| | | | |
|---|---|---|---|
| 4,257,806 A | 3/1981 | Fujita et al. | |
| 4,325,709 A | 4/1982 | Gohler et al. | |
| 4,391,611 A | 7/1983 | Haldipur et al. | |
| 4,493,636 A | 1/1985 | Haldipur et al. | |
| 4,765,781 A * | 8/1988 | Wilks et al. | 406/197 |
| 5,170,727 A | 12/1992 | Nielsen | |
| 5,361,513 A | 11/1994 | Woessner | |
| 5,392,594 A | 2/1995 | Moore et al. | |
| 5,423,894 A * | 6/1995 | Child et al. | 48/200 |
| 5,447,702 A | 9/1995 | Campbell et al. | |
| 5,560,900 A | 10/1996 | Gbordzoe et al. | |
| 5,578,093 A | 11/1996 | Campbell et al. | |
| 5,655,466 A | 8/1997 | Hulkkonen et al. | |
| 5,656,042 A * | 8/1997 | Khan et al. | 48/197 R |
| 5,685,138 A | 11/1997 | Rao et al. | |
| 5,953,899 A | 9/1999 | Rao et al. | |
| 6,054,043 A | 4/2000 | Simpson | |
| 6,488,728 B1 | 12/2002 | Rollinger | |
| 6,676,716 B2 | 1/2004 | Fujimura et al. | |
| 6,802,178 B2 | 10/2004 | Sprouse et al. | |
| 6,966,190 B2 | 11/2005 | Wylie | |
| 2002/0077512 A1 | 6/2002 | Tendick et al. | |
| 2003/0041518 A1 | 3/2003 | Wallace et al. | |
| 2003/0046868 A1* | 3/2003 | Lewis | 48/197 R |
| 2003/0131582 A1 | 7/2003 | Anderson et al. | |
| 2004/0182000 A1 | 9/2004 | Mansour et al. | |
| 2004/0221583 A1 | 11/2004 | Wylie | |
| 2005/0167333 A1 | 8/2005 | McCall et al. | |
| 2006/0096298 A1 | 5/2006 | Barmicki et al. | |
| 2006/0130719 A1 | 6/2006 | Morin et al. | |
| 2006/0149423 A1 | 7/2006 | Barmicki et al. | |
| 2006/0248791 A1 | 11/2006 | Hogsett et al. | |
| 2007/0137107 A1* | 6/2007 | Barnicki | 48/198.3 |
| 2007/0178035 A1* | 8/2007 | White et al. | 423/248 |

OTHER PUBLICATIONS

Barker, et al., "Pressure feeder for powered coal or other finely divided solids," I & EC, 43(5), p. 1204-1209.

Alessi, P., et al., "Particle production of steroid drugs using supercritical fluid processing," I&EC Res., 35(12), p. 4718-4726.

Maustad, Ola. "An Overview of Coal based Integrated Gasification Combined Cycle (IGCC) Technology," Massachusetts Institute for Technology—Laboratory for Energy and the Environment, Sep. 2005, MIT LFEE 2005-002 WP, pp. 1-36.

"PERP 03/04S11," Coal Gasification Technologies, Nexant Chem Systems, Jan. 2005, pp. 1-46.

Campbell, William M., et al. "Transport Gasifier," U.S. Appl. No. 08/090,804.

Agarwal, A.T., "Improving Rotary Valve Performance," Chemical Eng., Mar. 2005, p. 29-33.

Barker, et al. "Pressure feeder for powered coal or other finely divided solids," I & EC, 43(5), p. 1204-1209.

Alessi, P. et al., "Particle production of steroid drugs using supercritical fluid processing," I & EC Res., 35(12), p. 4718-4726.

"Coal: America's Energy Future, vol. II: A Technical Overview" Report of the National Coal Council, Mar. 2006.

Holt, Neville, "Gasification Process Selection—Trade-offs and Ironies," Electronic Power Research Institute Gasification Technologies Conference, Washington DC, Oct. 4-6, 2004.

\* cited by examiner

METHODS FOR FEEDSTOCK PRETREATMENT AND TRANSPORT TO GASIFICATION

BACKGROUND

1. Field

Embodiments herein generally relate to methods for syngas production. More particularly, the embodiments relate to methods for pretreating gasification feedstocks and efficient introduction of feedstock into reactors for syngas production.

2. Description of the Related Art

Gasification is a high-temperature process usually conducted at elevated pressure that converts carbon-containing material into mostly gaseous mixtures, including carbon-dioxide, carbon monoxide, hydrogen and methane. These gaseous mixtures are typically referred to as syngas. Upon production, syngas can be used as a feedstock to generate electricity and/or steam, a source of hydrogen, and for the production of other organic chemicals. Thus, gasification adds value to low-value feedstocks by converting them to marketable products. Coal, crude oil, coke, and high-sulfur residues have been used as gasification feedstock.

The feedstock is treated to minimize water carryover to the gasifier reactor to improve energy efficiency and lower water-shift reactions in the reactor. The feedstock is reacted in a gasifier (i.e. reactor) with an oxidizing medium in a reduced (stoichiometrically oxygen-starved) atmosphere at a high temperature and (usually) high pressure. In the gasifier, a water-gas shift reaction can occur where at least a portion of the carbon monoxide, with catalyst and/or high temperature, is reacted with water to produce predominantly hydrogen and carbon dioxide.

In certain gasifier systems, the feedstock has been fed in the form of a slurry, such as a coal-water mixture or a coal-solvent mixture via pumps to transfer the feedstock from the lockhoppers to the gasifier system. In other systems, the feedstock is typically treated in a lockhopper system that uses one or more flow control valves to distribute the treated feedstock from the lockhopper to the reactor system. Conventional lock hopper systems utilize nitrogen gas to provide an inert atmosphere therein. Nitrogen gas serves as an inert replacement for air where coal oxidation is undesirable.

The presence of nitrogen gas within the conventional lock hopper system, however, creates difficulties when transporting the treated feedstock to the gasifier. The lock hopper system is limiting because of leakage of gas across the rotary valves. Further this feed system does not improve the quality of feedstock to the gasifier, i.e. no increase of volatiles readily available for gasification nor feedstock porosity to increase the reaction rate and distribute the feed uniformly in the reactor.

A need, therefore, exists for methods for pretreating gasification feedstocks to alleviate or remedy such problems.

DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Figure 1:
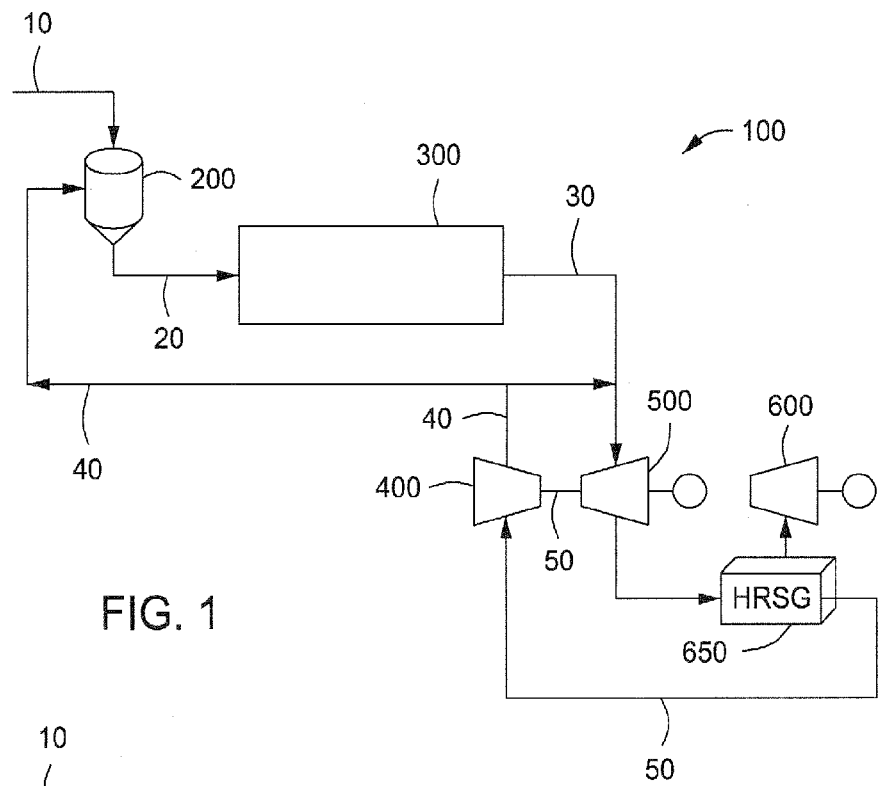
FIG. 1 depicts an illustrative system for producing syngas utilizing a feedstock pretreatment process according to one or more embodiments described.

A detailed description will now be provided. Each of the appended claims defines a separate embodiment, which for infringement purposes is recognized as including equivalents to the various elements or limitations specified in the claims. Depending on the context, all references below to the "embodiment" may in some cases refer to certain specific embodiments only. In other cases it will be recognized that references to the "embodiment" will refer to subject matter recited in one or more, but not necessarily all, of the claims. Each of the embodiments will now be described in greater detail below, including specific embodiments, versions and examples, but the embodiments are not limited to these embodiments, versions or examples, which are included to enable a person having ordinary skill in the art to make and use the embodiments, when the information in this patent is combined with available information and technology.

Methods for pretreating feedstock(s) for syngas production and methods for gasification are provided herein. In one or more embodiments, the feedstock can be pretreated with supercritical carbon dioxide. Supercritical carbon dioxide can be used to release volatiles, remove moisture, increase porosity, and/or increase reactivity of the feedstocks. In at least one specific embodiment, the supercritical carbon dioxide can be obtained by compressing and cooling or heating a gasification byproduct that contains carbon dioxide. The gasification byproduct can be produced from oxidation of the feedstock, combustion of syngas, and/or reactions within heat recovery systems. The gasification byproduct containing carbon dioxide can be compressed and cooled or heated to supercritical conditions to produce supercritical carbon dioxide. The supercritical carbon dioxide can be contacted with the feedstock prior to gasification. Recycling the carbon dioxide at supercritical conditions to the feedstock prior to gasification provides an excellent balance in stability, flexibility, efficiency and safety with low to no emissions.

The term "supercritical carbon dioxide" as used herein refers to a fluid containing carbon dioxide at a temperature and pressure above the critical temperature and pressure of the fluid. Supercritical carbon dioxide can have physical properties between those of a liquid and gas. Carbon dioxide has a critical temperature ($T_c$) of about 31.1° C. (88° F.) and a critical pressure ($P_c$) of about 73.8 bar (1070 psia).

The methods for gasification can be performed in a single system (i.e. train) having one or more systems for pretreating gasification feedstock, gasification systems, and compression systems. The methods can be performed in two or more systems (i.e. two or more trains) that are arranged in series or parallel. Each system can be configured independent from the other(s) or configured where any of the one or more pretreatment systems, gasification systems, and compression systems can be shared. For simplicity and ease of description, embodiments of the invention will be further described with reference to a single system having one or more pretreatment systems, gasification systems, and compression systems.

With reference to the figures, FIG. 1 depicts an illustrative system 100 for producing syngas utilizing a feedstock pretreatment process according to one or more embodiments described. In one or more embodiments, the system 100 for producing syngas includes one or more pretreatment systems 200, gasification systems 300, and recycle gas compression systems 400. Upon addition of a stream 10 containing raw feedstock ("raw feedstock stream"), each pretreatment system 200 can be used to release volatiles, remove moisture, increase porosity, increase reactivity, or any combination thereof, to provide a stream 20 containing the treated feedstock for gasification ("treated feedstock stream"). The treated feedstock stream 20 can be introduced to the one or more gasification systems 300 to provide one or more streams 30 containing syngas ("syngas stream").

In one or more embodiments, at least a portion of the syngas stream 30 can be used to power one or more combustion turbines 500. The exhaust from the combustion turbines 500 can be directed to one or more heat recovery systems 650 and/or steam turbines 600.

The combustion turbines 500 and/or heat recovery systems 650 can generate carbon dioxide. The carbon dioxide can be recycled to the one or more gas compression systems 400 via stream 50. The carbon dioxide from stream 50 can be purified, compressed and heated or cooled to supercritical conditions within the compression system 400 unit operation area, and returned to the pretreatment system 200 via stream 40 ("supercritical carbon dioxide stream"). In one or more embodiments, at least a portion of stream 40 can be directed to the combustion turbines 500 and/or heat recovery systems 650.

The term "feedstock" as used herein refers to a raw material, whether solid, gas or liquid, used to produce a syngas. For example, the feedstock can include one or more carbonaceous materials. Illustrative carbonaceous materials include but are not limited to biomass (i.e, plant and/or animal matter or plant and/or animal derived matter); coal (high-sodium and low-sodium lignite, subbituminous, and/or anthracite for example); oil shale; coke; tar; heavy oil; and asphalt. The carbonaceous materials can be combined with hydrocarbon-based polymeric materials such as thermoplastics, elastomers and rubbers, polypropylenes, polyethylenes, polystyrenes, including copolymers and blends thereof; heavy hydrocarbon sludge and bottoms products from petroleum refineries and petrochemical plants; derivatives thereof; and mixtures and combinations thereof.

In one or more embodiments above or elsewhere herein, the feedstock can include a mixture or combination of one or more carbonaceous materials such as low ash or no ash polymer, biomass derived material, or by-product derived from manufacturing operations or produced as a result of governmental mandates to dispose of previously manufactured materials. For example, the feedstock can include one or more carbonaceous materials combined with one or more discarded consumer products such as carpet and/or car parts such as bumpers and dashboards. In one or more embodiments above or elsewhere herein, the feedstock can include recycled plastics such as polypropylene.

In one or more embodiments above or elsewhere herein, the feedstock can include a dry feed used for high moisture fuels such as subbituminous coal and lignite. In one or more embodiments above or elsewhere herein, the feedstock can be dried, and then pulverized by milling units such as one or more parallel bowl mills prior to feeding to the pretreatment system 200.

In one or more embodiments above or elsewhere herein, the feedstock can have an average particle diameter size from the range of about 50 µm to about 500 µm or from about 50 µm to about 400 µm. In one or more embodiments above or elsewhere herein, the average particle diameter size of the feedstock can be in the range of from about 150 µm to about 450 µm or from about 200 µm to about 400 µm.

Figure 2:
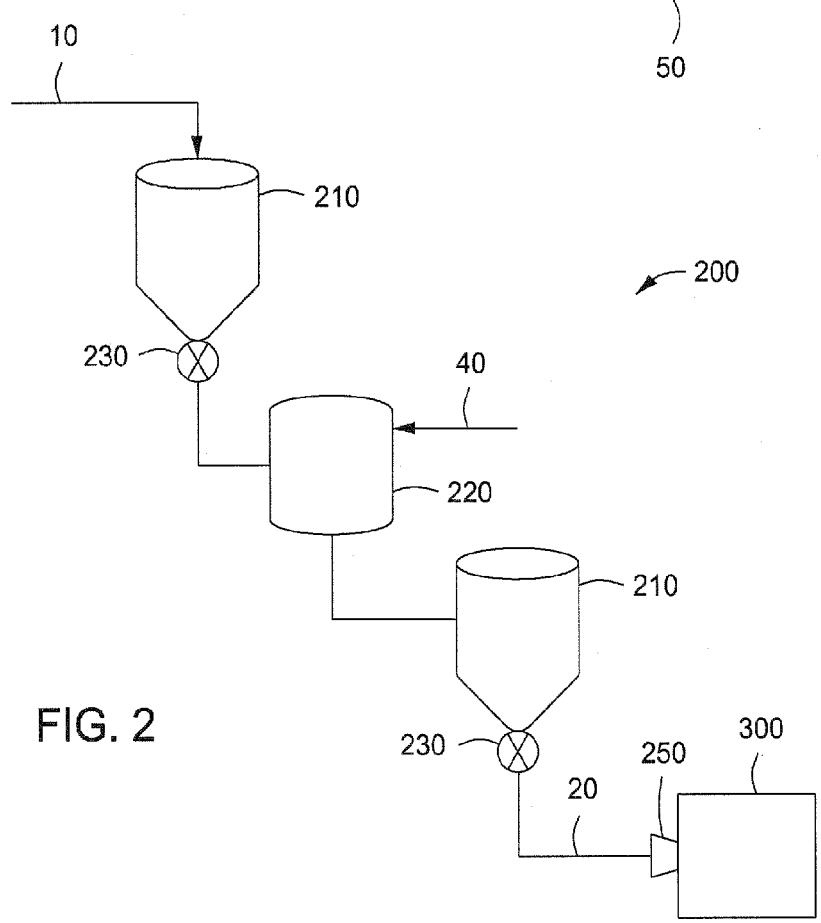
FIG. 2 depicts an illustrative system for pretreating a feedstock according to one or more embodiments described.

Considering the pretreatment system 200 in more detail, FIG. 2 depicts an illustrative system 200 for pretreating a feedstock according to one or more embodiments described. The pretreatment system 200 can include one or more lock hoppers 210, intermediate vessels 220, and flow control valves 230. In one or more embodiments, the system 200 can include one or more lockhoppers 210, intermediate vessels 220, and flow control valves 230 arranged in parallel or series. For example, two lock hoppers 210 (first lockhopper and second lockhopper) with accompanying flow control valves 230 (first flow valve and second flow valve) can be arranged around a single intermediate vessel 220 in series as depicted.

The system 200 can allow for crushed feedstock via stream 10 to be loaded in the first lockhopper 210 and pressurized by an inert gas. The pressurized feedstock can then be transferred through the first flow valve 230 into the intermediate vessel 220 by gravity via one or more feeder lines suitable in the art for the system described. The pressure in the intermediate vessel 220 can be raised. Feedstock in the intermediate vessel 220 can be transferred into the second lockhopper 210 by gravity via one or more feeder lines suitable in the art. Treated feedstock via stream 20 can exit the second lockhopper 210 through a second flow valve 230 prior to entry into a nozzle 250. The nozzle 250 can facilitate feedstock entry into the gasification system 300. Flow control valves 230 can be of several types suitable in the art, including but not limited to rotary valves, screw feeders, and/or rotating disc valves.

In one or more embodiments, the intermediate vessel 210 and the second lockhopper 210 can be in pressure equilibrium. Alternatively, in one or more embodiments, a valve (not shown) below the intermediate vessel 220 can be closed, thus neutralizing the pressure of the first lockhopper 210 and the intermediate vessel 220 from the rest of the series ahead of the intermediate vessel 220. The cycle of transferring and pressurizing feedstock from the intermediate vessel 220 can be repeated such that the feedstock flow from the second lockhopper 210 and second flow valve 230 can continuously feed treated feedstock via stream 20 to the nozzle 250 and gasification system 300.

In one or more embodiments, the raw feedstock via stream 10 can be mixed with supercritical carbon dioxide within the intermediate vessel 220 in lieu of an inert gas. The supercritical carbon dioxide can be provided via stream 40. During start-up, carbon dioxide can be sourced from purchased tanks to fill in the inventory as most of it can be recycled, carbon dioxide can be routed from other combustion units in the complex such as other energy sources, or nitrogen can be used.

In one or more embodiments above or elsewhere herein, the intermediate vessels 220 can be pressurized with the supercritical carbon dioxide. For example, the supercritical carbon dioxide can be used to increase the pressure within the intermediate vessels 220 to a pressure of approximately above 73.8 bar.

Referring now to FIGS. 1 and 2, supercritical carbon dioxide can be recycled via stream 40 from the one or more compression systems 400 to increase the pressure of the intermediate vessel 220 from about atmospheric to above the critical pressure of carbon dioxide. The temperature in the intermediate vessel 220 can be above or below the critical temperature of carbon dioxide. In one or more embodiments it can be desirable to have the temperature of the intermediate vessel 220 above the critical temperature of the carbon dioxide so that the fluid in the intermediate vessel 220 can be supercritical, thereby increasing feedstock residence time and release of hydrocarbons from the feedstock. In one or more embodiments it can be desirable to have the temperature in the intermediate vessel 220 below the critical temperature of carbon dioxide to reduce the vessel size because the residence time requirement for release of hydrocarbons may be extremely small and can be accomplished in the second hopper 210 or in the transfer to the gasification system 300.

In one or more embodiments above or elsewhere herein, the supercritical carbon dioxide can provide significant improvements to the feedstock feed, including but not limited to volatiles extraction, porosity, reactivity, and reduction of particle size for better syngas quality. The supercritical carbon dioxide can also increase carbon conversion, yielding higher quality syngas. For gasifier reactors it can be imperative that feedstock be prepared such that the conversion of carbonaceous components of feedstock to high energy components of syngas can readily progress. The conversion of feedstock can be facilitated by making volatiles readily accessible in the gasifier, increasing the surface area of feedstock particles by increasing porosity and reducing particle diameter. Also, the use of inert material to convey the coal to the reactor can result in the syngas having lower energy content per unit mass. In one or more embodiments, the use of carbon dioxide also can act as a source of oxidizing material for the gasification of feedstock in the gasifier, thus reducing the requirement of oxygen or an air separation unit, and reducing the inert content in the produced syngas.

Although the foregoing has been described with reference to supercritical carbon dioxide, it is believed that any supercritical fluid can be used. Supercritical fluids can be regarded as "hybrid solvents" with properties between those of gases and liquids, i.e. a solvent with a low viscosity, high diffusion rates and low surface tension. In the case of supercritical carbon dioxide, the viscosity can be in the range of about 20 µPa·s to about 100 µPa·s (about 0.02 cP to about 0.1 cP). In comparison, liquids have viscosities of approximately 500 µPa·s to approximately 1000 µPa·s (approximately 0.5 cP to approximately 1.0 cP) and gases approximately 10 µPa·s (approximately 0.01 cP). Diffusivities of solutes in supercritical carbon dioxide can be up to a factor of about 10 times higher than that in liquid solvents. These properties can be strongly pressure dependent in the vicinity of the critical point, making supercritical carbon dioxide a highly tunable solvent. Supercritical carbon dioxide can extract a substantial amount of volatiles from feedstock, increase feedstock porosity, and improve gasifier reactivity.

The higher density of supercritical dioxide can decrease leakage across the flow valves 230 in the pretreatment system 200 resulting in increased reliability of the pretreatment or feed system. The leakage rate across the flow valves 230 can be inversely proportional to the density of the gas passing therethrough. For example, liquid material can pack across a flow valve better than a gas material because the liquid material has a higher density than the gas material. Though supercritical carbon dioxide gas cannot be as dense as a liquid, the density of supercritical carbon dioxide can be greater than that of a gas. Supercritical carbon dioxide (at pressures above about 1100 psig) can have about three times higher density than compressed carbon dioxide (at pressures of about 500 psig). Supercritical carbon dioxide can have substantially higher density compared to nitrogen. The substantially higher density of supercritical carbon dioxide can thus increase the efficiency of the flow valves 230 in the pretreatment system 200.

In one or more gasifier embodiments, the expansion of the supercritical carbon dioxide in the gasification system 300 can accelerate feedstock particles to mix with inert solids. Intimate mixing of feedstock particles with a heat source can be beneficial for the gasification system 300 operating in a short residence time mode.

Upon depressurization across the nozzle 250 and upon heating inside the gasification system 300, the supercritical carbon dioxide volume can rapidly expand to below supercritical levels and cause an increase in feedstock velocity. Across the nozzle 250, supercritical carbon dioxide can thus have substantially more volume expansion, and an increase in feedstock velocity than that of a similar volume of nitrogen resulting in a higher momentum for the feedstock to be better distributed in the reactor. In one or more embodiments, the nozzle 250 can be designed to maximize the acceleration of feedstock particles to penetrate a moving bed in a riser and improve mixing zone performance.

The pretreatment with supercritical carbon dioxide can allow the use of a wider array of raw feedstock, including coals with volatiles and coals that retain the volatiles by strong adsorption. The relatively low temperature of the supercritical carbon dioxide, beginning at about the critical temperature of 31.1° C., and the stability of carbon dioxide can allow most compounds to be extracted with little solvent reactivity, feedstock damage, and feedstock denaturing. In one or more embodiments, the rapid expansion by depressurization and heating of the supercritical carbon dioxide in the gasification system 300 can stabilize the solids in the gasifier reactor.

Use of supercritical carbon dioxide in the pretreatment system 200 can improve reliability of the feed system to the gasification system 300. Utilizing the feedstock pretreatment system 200 with supercritical carbon dioxide can substantially decrease feedstock bound volatile content and improve performance of the lock hoppers 210, intermediate vessels 220, rotary valves 230, feed lines, and nozzles 250 of the pretreatment system 200. The supercritical carbon dioxide can also be a promising green solvent because it can be non-toxic and efficiently recycled as a byproduct from gasification.

Figure 3:
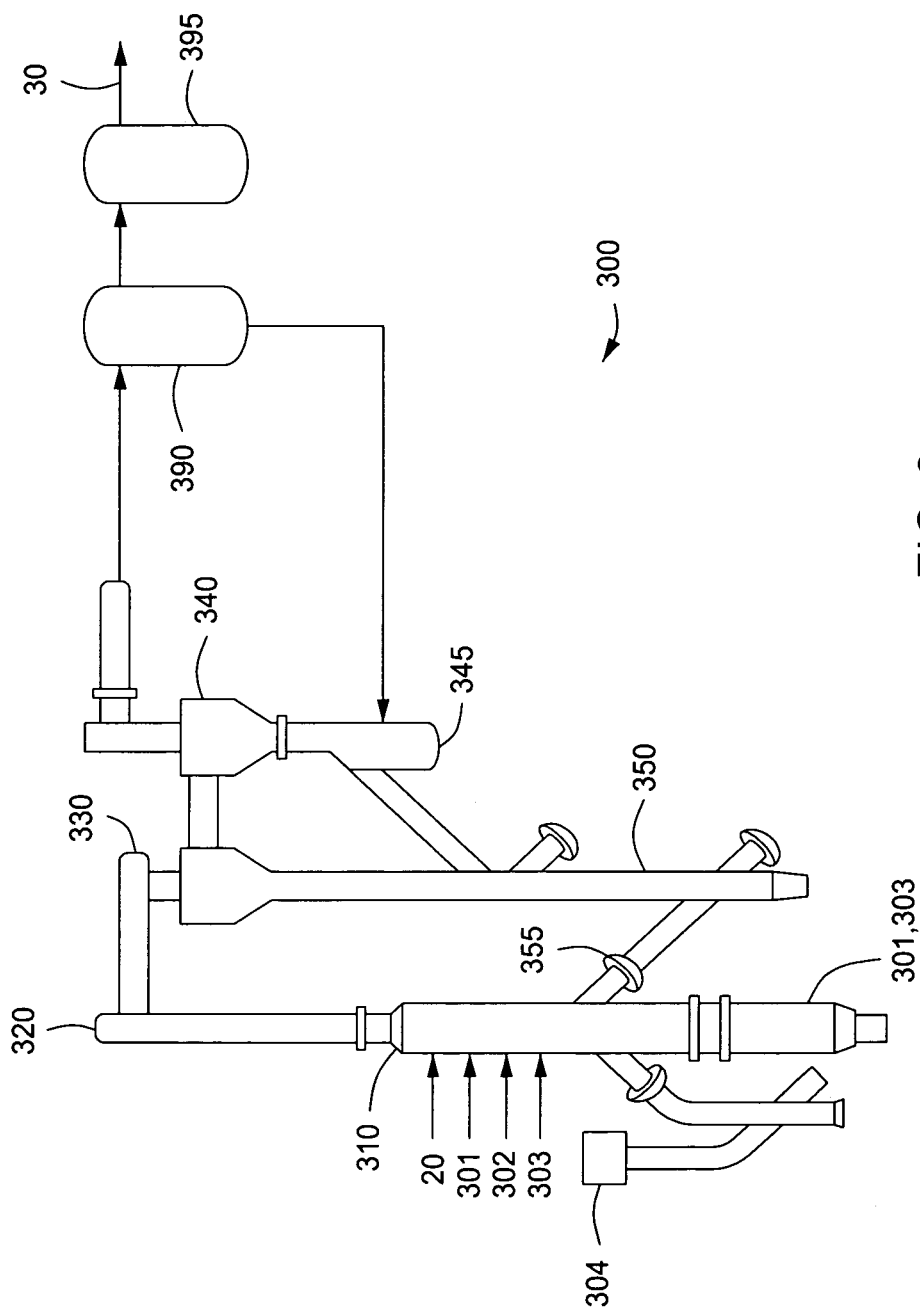
FIG. 3 depicts an illustrative system for gasifying a feedstock according to one or more embodiments described.

Considering the gasification system 300 in more detail, FIG. 3 depicts an illustrative system 300 for gasifying a feedstock according to one or more embodiments described. In one or more embodiments, the gasification system 300 can include a single reactor unit having one or more mixing zones 310, risers 320, disengagers 330 and cyclones 340. The solid particulates from the reactor can at least partially be removed from the syngas within one or more disengagers 330, cyclones 340, and/or particulate removal systems 390. The separated syngas can then be cooled and cleaned to remove contaminants including one or more sulfur-containing compounds within one or more gas cleanup systems 395.

The gasification system 300 can also include two or more reactor units arranged in series or parallel. Each reactor unit can be configured independent from the others or configured where any of the one or more mixing zones 310, risers 320, disengagers 330, and/or cyclones 340 can be shared. For simplicity and ease of description, embodiments of the invention will be further described in the context of a single reactor unit.

The treated feedstock stream 20, oxidant, and water are combined to produce a raw syngas. The oxidant can be introduced via stream 301 ("oxidant stream"). The water can be introduced via stream 303 ("water stream").

The one or more oxidants can include air, oxygen, essentially oxygen, oxygen-enriched air, mixtures of oxygen and air, mixtures of oxygen and gas, mixtures of oxygen and inert gas such as nitrogen or argon, and the like. In one or more embodiments above or elsewhere herein, the one or more oxidants can be introduced into the mixing zone 310 at a rate suitable to control the temperature of the mixing zone 310. In one or more embodiments above or elsewhere herein, a molar ratio of oxygen to carbon in the recycled particles can be maintained at a substoichiometric proportion to promote the formation of carbon monoxide over carbon dioxide in the mixing zone 310. Thus, in one or more embodiments, the oxygen supplied via the oxidant to the mixing zone 310 can be less than about five percent of the stoichiometric amount of oxygen required for complete combustion of all the carbon supplied (whether from coal, polymer and/or biomass waste) to the mixing zone 310.

One or more treated feedstocks via stream 20 and one or more oxidants via stream 301 can be combined in the mixing zone 310. One or more sorbents via stream 302 ("sorbent stream") can also be used. In one or more embodiments above or elsewhere herein, the sorbent stream 302 can be optionally admixed with the treated feedstock stream 20 to adsorb or consume significant errant oxygen entering the mixing zone 310 at a rate and level sufficient to delay or prevent the errant oxygen from reaching a concentration that results in undesirable reactions with hydrogen. The treated feedstock stream 20 and sorbent stream 302 can be mixed and fed together, or they can be fed separately to the mixing zone 310. The one or more treated feedstock streams 20, oxidant streams 301 and optional sorbent streams 302 can be injected sequentially or simultaneously.

In one or more embodiments, the one or more oxidants via stream 301 and water via stream 303 can be introduced at the bottom of the mixing zone 310, operating at up to about 285 psig and about 1800 F, to raise heat by burning the carbon in the recirculated solids ("char"). The treated feedstock stream 20 and optional sorbent stream 302 can be fed to the top of the mixing zone 310 to separate the treated feedstock from the oxidant and avoid burning the volatile material produced when the feedstock is heated. The solids and gases can be carried from the mixing zone 310 into the riser 320 where devolatilization and carbon-steam gasification reactions can occur. In one or more embodiments, at least a portion of the sulfur released from the coal can be captured as calcium sulfide by the calcium in the treated feedstock or by the added calcium-based sorbent.

The gas with entrained solids moves up through the mixing zone 310 into the riser 320 (which can have a slightly smaller diameter). The gas exits the riser 320 to enter the one or more disengagers 330 where the larger particles in the gas stream are removed by gravity separation. The remaining particles can be removed in the one or more cyclones 340. In one or more embodiments, the gas can exit the cyclones 340 and enter the one or more particulate removal systems 390 for further particulate removal.

As mentioned, the unreacted char and sorbent-derived material leaving the riser 330 can be captured by the disengager 330 and cyclone 340 and recycled to the mixing zone 310 through the loopseal 345, standpipe 350, and/or j-leg 355. The j-leg 355 can be a nonmechanical "j-valve." Non-mechanical "y-valves" or "L-valves" can also be used. This recycling increases the effective solids residence time, increases the carbon conversion, and improves sorbent utilization.

Considering the riser 320 in more detail, the gas with entrained solids from the mixing zone 310 can enter the riser 320 where additional residence time allows char gasification, methane/steam reforming, water-shift and/or sulfur capture reactions to occur. In one or more embodiments above or elsewhere herein, the gas velocity in the riser 320 ranges from about 3 m/s to about 28 m/s, from about 6 m/s to about 25 m/s, from about 9 m/s to about 22 m/s, from about 10 m/s to about 20 m/s, or from about 9 m/s to about 15 m/s. In one or more embodiments above or elsewhere herein, the residence time and high temperature conditions in the riser 320 can provide for a water-shift reaction to reach equilibrium.

In one or more embodiments above or elsewhere herein, the mixing zone 310 can be operated at a moderate temperature as low as about 788° C. (1450° F.). In one or more embodiments above or elsewhere herein, the gasifier reactor can be operated in a temperature range of from about 1050° F. to about 1900° F., from about 1540° F. to about 1710° F., or at a suitable temperature below that which would melt the ash.

Heat can be supplied by a startup burner 304 burning the carbon in the recirculated solids in the lower part of the mixing zone 310 before recirculated solids contact the entering feedstock. Startup (i.e. prior to feeding the feedstock to the mixing zone 310) can be commenced by bringing the mixing zone 310 to a temperature of from about 950° F. to about 1200° F. and optionally feeding coke breeze or the equivalent to the mixing zone 310 to raise the temperature to about 1650° F.

In one or more embodiments, the operating temperature of the mixing zone 310 ranges from a low of about 500° F., 750° F., or 1000° F. to a high of about 1200° F., 1500° F., or 1800° F. In one or more embodiments above or elsewhere herein, the operating temperature of the mixing zone 310 ranges from about 700° F. to about 1750° F., from about 900° F. to about 1600° F., or from about 1200° F. to about 1600° F.

In one or more embodiments above or elsewhere herein, the operating temperature can be controlled by the recirculation rate of the solids, optional heat removal from the ash prior to entering the mixing zone 310, and oxidant 301 supply to the mixing zone 310. Excess oxygen in the air can be consumed by the recirculating solids forming primarily carbon dioxide, thereby minimizing tar formation and stabilizing reactor temperature during operation and periods of feed interruption, if any. The recirculating solids also can serve to rapidly heat the incoming feedstock and minimize tar formation.

In one or more embodiments above or elsewhere herein, the mixing zone 310 can be operated at pressures from about 0 psig to about 700 psig to increase thermal output per unit reactor cross-sectional area and enhance energy output in the subsequent power cycle. In one or more embodiments above or elsewhere herein, the mixing zone 310 can be operated at pressures from about 100 psig to about 650 psig, from about 100 psig to about 600 psig, or from about 100 psig to about 550 psig.

Considering the one or more particulate removal systems 390 in more detail, the one or more particulate removal systems 390 can include one or more coolers for cooling the syngas. In one or more embodiments above or elsewhere herein, the particulate removal systems 390 can include additional disengagers 330 and cyclones 340 which are known in the art for solids removal. In one or more embodiments above or elsewhere herein, the particulate removal systems 390 can include one or more particulate control devices ("PCD"). One or more sintered metal filters, metal filter candles, and/or ceramic filter candles (for example, iron aluminide filter material) can be used as a PCD.

Considering the one or more gas cleanup systems 395 in more detail, the one or more gas cleanup systems 395 can include one or more coolers for cooling the syngas. The gas cleanup systems 395 can include water quench, radiant and convective coolers, chemical quench and gas recycle quench to cool the syngas. In one or more embodiments, the gas cleanup system 395 can further include one or more primary coolers (not shown) or syngas heat recovery systems (not shown). The primary cooler or syngas heat recovery system can be used to recover heat from the high-temperature gasifier operation. Heat recovery can reclaim 5 to 25 percent of the energy in the feed depending on the process conditions. In one or more embodiments above or elsewhere herein, the raw syngas leaving the gasifier reactor flows to the heat recovery system where the syngas can be cooled by radiant and/or convective exchange. In one or more embodiments, the raw syngas can be cooled by a direct quench system, wherein water or cool recycle gas is injected into the hot raw syngas. The syngas can then pass through a series of heat exchangers for recovery of heat utilized for steam generation or process heating.

The one or more gas cleanup systems 395 can also include one or more processes to remove sulfur and other contaminants from the synthesis gas. Such processes for removing sulfur can include, but are not limited to, the use of zinc titanate, zinc ferite, tin oxide, zinc oxide, iron oxide, copper oxide, cerium oxide or mixtures thereof as well as the Selexol™ process, and the Sulfinol® Gas Treatment Process. The one or more gas cleanup systems can also be or include the CrystaSulf® $H_2S$ adsorber. In one or more embodiments above or elsewhere herein, mercury is removed using a bed of sulfur-impregnated activated carbon.

In one or more embodiments above or elsewhere herein, the syngas stream 30 produced in the gasification system 300 includes carbon monoxide, hydrogen, oxygen, hydrocarbons, sulfur, and solids. In one or more embodiments above or elsewhere herein, the syngas stream 30 produced in the gasification system 300 can be nearly nitrogen-free. In one or more embodiments above or elsewhere herein, the process converts at least about 85%, 90%, 95%, 98%, or 99% of the carbon from the treated feedstock to syngas.

Referring again to FIG. 1, the recycled carbon dioxide stream 50 from the overall process 100 can be compressed and heated above the critical pressure (Pc) and critical temperature (Tc) through one or more gas compression systems 400 to provide a supercritical carbon dioxide stream 40, which is recycled to the front end of the process 100 at the one or more pretreatment systems 200. Considering the gas compression systems 400 in more detail, any gas compressor (not shown) and amount of heat suitable for the operating conditions described can be used. In one or more embodiments above or elsewhere herein, the gas compression systems 400 can further include coupling with one or more gas turbines 500, steam turbines 600, and/or heat recovery systems 650.

In one or more embodiments above or elsewhere herein, the process 100 can include a combined cycle system, for example a Brayton cycle and a Carnot cycle, for power generation, wherein gaseous fuel from the syngas stream 30 can be combined with oxygen-bearing gas, combusted at a combustor (not shown), and fed to one or more combustion gas turbines 500 to generate electrical and/or mechanical energy via a generator. The hot exhaust gases from the combustion turbine 500 can be fed to one or more heat recovery steam generator systems 650 wherein a fraction of the thermal energy in the hot exhaust gases can be recovered as steam. The heat recovery steam generator 650 can be a dual-pressure unit with single reheat having a main steam pressure of about 1800 psia. The steam from the one or more of the heat recovery systems 650 along with any steam generated in other units of the process 100 can be fed to one or more steam turbines 600 to generate electrical or mechanical energy via one or more generators before rejecting any remaining low level heat in the turbine exhaust to a condensation medium. Other suitable embodiments can include humid air turbine cycles and the Tophat cycle. The recycled carbon dioxide stream 50 generated from the combustor in the combustion turbines 500 and heat recovery systems 650 along with carbon dioxide generated from other sections of the process 100 can be recycled to one or more gas compression systems 400.

Any one or more of the described embodiments may be combined with another. The gasification process described provides an excellent balance in flexibility, efficiency and safety with low to no emissions. The process in various embodiments operates at significantly higher circulation rates, velocities, and solvent densities compared to other pretreatment methods. This results in higher throughput, better mixing, and increased mass and transfer rates. The pretreatment system and method for gasification also include high carbon conversion due to excellent gas/solids contact, low water consumption, high percentage carbon dioxide recirculation, high volatile capture, high throughput, and high heat release rates that contribute to a small footprint as well as a simple mechanical design.

Specific embodiments can further include methods for pretreating feedstock for gasification comprising: combining a coal based feedstock stream and supercritical carbon dioxide stream within a pretreatment system to provide a treated feedstock stream; passing at least a portion of the treated feedstock stream to a gasifier to produce a synthesis gas stream comprising less than 50% by volume carbon dioxide, at least 5% by volume carbon monoxide and at least 1% by volume hydrogen; combusting at least a portion of the synthesis gas stream to form an exhaust stream comprising carbon dioxide; compressing at least a portion of the gasification byproduct stream to produce supercritical carbon dioxide; and recycling at least a portion of the supercritical carbon dioxide to the pretreatment system.

Specific embodiments can further include the methods of paragraph [0056] and one or more of the following embodiments: wherein the coal based feedstock stream comprises feedstock having an average particle size ranging from 150 µm to 450 µm; wherein the coal based feedstock is selected from the group consisting of high-sodium lignite, low-sodium lignite, subbituminous, bituminous and anthracite; wherein the supercritical carbon dioxide is combined with the feedstock stream in an amount sufficient to increase distribution of the feedstock to the gasifier; wherein the coal based feedstock stream and supercritical carbon dioxide stream are mixed within an intermediate vessel of a lockhopper in the pretreatment system; and/or wherein the coal based feedstock within the intermediate vessel of the lockhopper is pressurized using the supercritical carbon dioxide.

Specific embodiments can further include methods for pretreating feedstock for gasification comprising: mixing a coal based feedstock with supercritical carbon dioxide to increase the volatile content of the feedstock; passing at least a portion of the feedstock to a gasifier to produce a synthesis gas; combusting at least a portion of the synthesis gas to form an exhaust gas comprising carbon dioxide; compressing and heating the carbon dioxide to produce supercritical carbon dioxide; and recycling at least a portion of the supercritical carbon dioxide to the feedstock prior to the gasifier.

Specific embodiments can further include the methods of paragraph [0058] and one or more of the following embodiments: wherein the coal based feedstock stream comprises feedstock having an average particle size ranging from 150 µm to 450 µm; wherein the coal based feedstock is selected from the group consisting of high-sodium lignite, low-sodium lignite, subbituminous, bituminous and anthracite; wherein the carbon dioxide is an exhaust gas from one or more combustion turbines; wherein the coupling provides an additional carbon dioxide stream; and/or further including coupling the compression of carbon dioxide with the combustion of the synthesis gas stream.

Specific embodiments can further include systems for gasification comprising: a feedstock pretreatment unit comprising one or more lockhoppers, one or more intermediate vessels, and one or more rotary valves, wherein a feedstock to be treated is contacted with supercritical carbon dioxide within the one or more intermediate vessels to provide a treated feedstock; a gasification unit comprising one or more gasifiers; a compression unit; and a combustion turbine, wherein the rotary valves pass the treated feedstock to the gasification unit, and the supercritical carbon dioxide decreases leakage across the rotary valves.

Specific embodiments can further include the systems of paragraph [0060] and one or more of the following embodiments: further including at least one heat recovery system; wherein the gasification unit produces a synthesis gas that can be combusted within the one or more combustion turbines forming an exhaust gas comprising carbon dioxide; wherein the compression unit compresses and heats the carbon dioxide to supercritical conditions; wherein the intermediate vessel is disposed within the lockhopper; wherein the intermediate vessel is pressurized using the supercritical carbon dioxide; wherein the supercritical carbon dioxide is contacted with the feedstock stream in an amount sufficient to increase distribution of the feedstock to the gasifier; and/or wherein the supercritical carbon dioxide is mixed with the feedstock stream in an amount sufficient to increase distribution of the feedstock to the gasifier.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments may be devised without departing from the basic scope thereof, and the scope thereof is determined by the claims that follow.

What is claimed is:

1. A method for pretreating feedstock for gasification comprising:
    combining a coal based feedstock and supercritical carbon dioxide within a pretreatment system to provide a treated feedstock;
    passing at least a portion of the treated feedstock to a gasifier to produce a synthesis gas comprising less than 50% by volume carbon dioxide, at least 5% by volume carbon monoxide and at least 1% by volume hydrogen;
    combusting at least a portion of the synthesis gas comprising less than 50% by volume carbon dioxide to form an exhaust gas comprising carbon dioxide;
    compressing at least a portion of the exhaust gas to produce compressed carbon dioxide; and
    recycling at least a portion of the compressed carbon dioxide at supercritical conditions to the pretreatment system.

2. The method of claim 1 wherein the coal based feedstock comprises feedstock having an average particle size ranging from 150 µm to 450 µm.

3. The method of claim 1 wherein the coal based feedstock is selected from the group consisting of high-sodium lignite, low-sodium lignite, subbituminous, bituminous and anthracite.

4. The method of claim 1 wherein the supercritical carbon dioxide is combined with the feedstock in an amount sufficient to increase distribution of the feedstock to the gasifier.

5. The method of claim 1 wherein the coal based feedstock and supercritical carbon dioxide are mixed within an intermediate vessel of a lockhopper in the pretreatment system.

6. The method of claim 5 wherein the coal based feedstock within the intermediate vessel of the lockhopper is pressurized using the supercritical carbon dioxide.

7. The method of claim 1, further comprising introducing one or more oxidants to the gasifier, wherein the one or more oxidants is present in an amount less than about 5% of the stoichiometric amount of oxygen required for complete combustion of all the carbon dioxide introduced to the gasifier.

8. The method of claim 7, wherein the coal based feedstock comprises one or more polymeric materials.

9. The method of claim 8, wherein the one or more polymeric materials comprise polypropylene, polyethylene, polystyrene, copolymers thereof, blends thereof, or any combination thereof.

10. A method for pretreating feedstock for gasification comprising:
    mixing a coal based feedstock with supercritical carbon dioxide to increase the volatile content of the feedstock;
    passing at least a portion of the feedstock to a gasifier to produce a synthesis gas;
    combusting at least a portion of the synthesis gas comprising less than 50% by volume carbon dioxide to form an exhaust gas comprising carbon dioxide;
    purifying, compressing, and heating the carbon dioxide to produce a compressed carbon dioxide at supercritical conditions; and
    recycling at least a portion of the supercritical carbon dioxide at to the feedstock prior to the gasifier.

11. The method of claim 10 wherein the coal based feedstock comprises feedstock having an average particle size ranging from 150 µm to 450 µm.

12. The method of claim 10 wherein the coal based feedstock is selected from the group consisting of high-sodium lignite, low-sodium lignite, subbituminous, bituminous and anthracite.

13. The method of claim 10 wherein the exhaust gas is from one or more combustion turbines.

14. The method of claim 10, further comprising coupling the compression of the carbon dioxide with the combustion of the synthesis gas.

15. The method of claim 14, wherein the coupling provides additional carbon dioxide.

16. The method of claim 10, wherein the supercritical carbon dioxide is mixed with the feedstock in an amount sufficient to increase distribution of the feedstock to the gasifier.

* * * * *